March 22, 1949. S. S. BROWN 2,465,195
SHORT-CIRCUITER FOR ALTERNATING CURRENT MOTORS
Filed Jan. 8, 1947
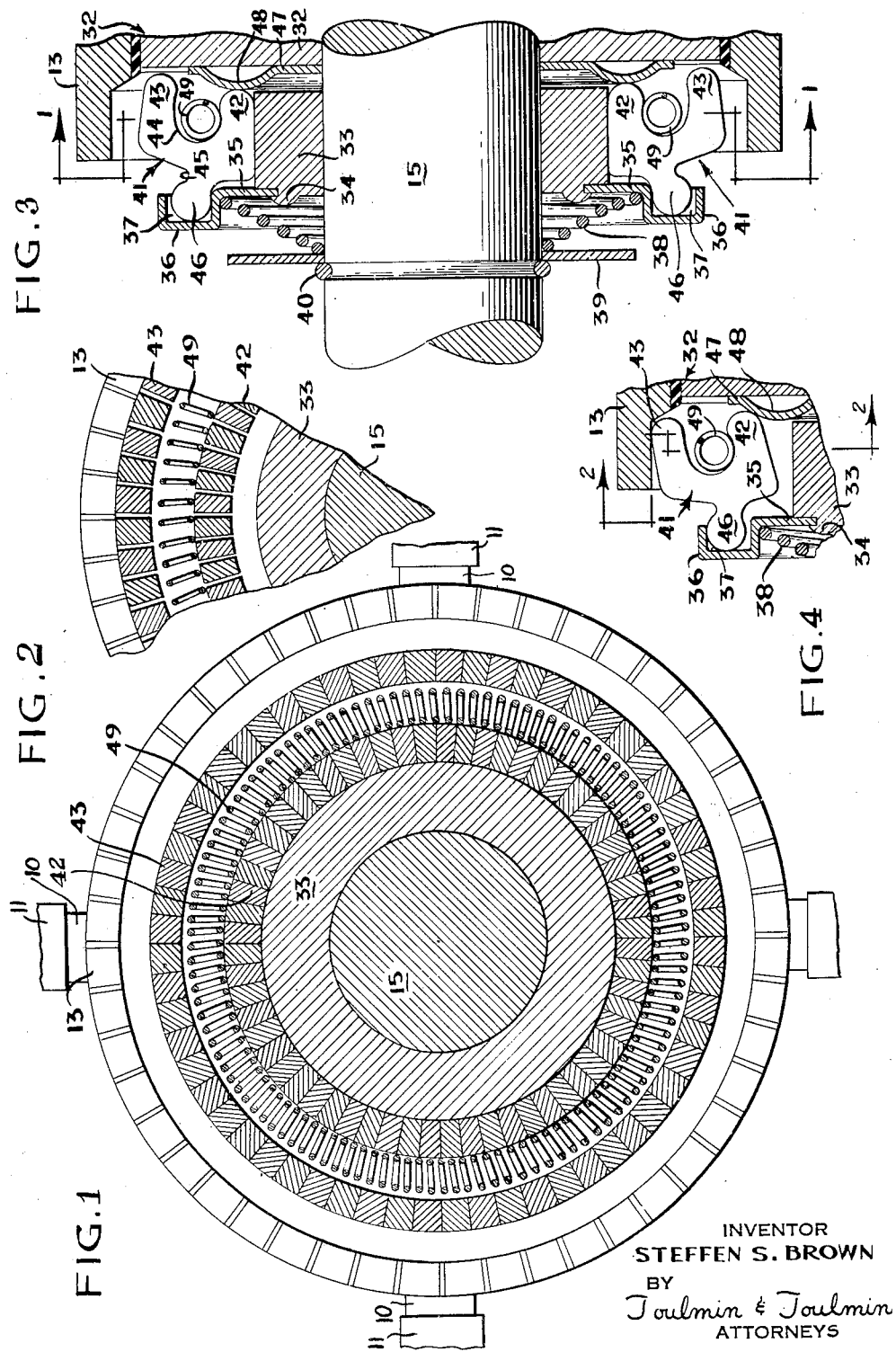
INVENTOR
STEFFEN S. BROWN
BY
Toulmin & Toulmin
ATTORNEYS Patented Mar. 22, 1949

2,465,195

UNITED STATES PATENT OFFICE 2,465,195

SHORT-CIRCUITER FOR ALTERNATING CURRENT MOTORS

Steffen S. Brown, Dayton, Ohio, assignor to The Brown-Brockmeyer Co., Dayton, Ohio, a corporation of Ohio Application January 8, 1947, Serial No. 720,837

15 Claims. (Cl. 172—279)

1

The present invention relates to electrical apparatus, more particularly to electric motors.

The primary object of the invention is to provide an improved alternating current motor which starts with a high torque and upon attaining a high speed will be converted into an efficient motor running under full load.

Another object of the invention is to provide a motor which starts on the repulsion-induction principle and then changes over to squirrel cage operation, this change-over being accomplished as a positive or snap action at a predetermined speed.

Still another object is to provide an alternating current motor in which improved short-circuiters are employed to change the operation from repulsion to squirrel cage.

Another object is to provide an alternating current motor which employs short-circuiters for effecting the starting characteristics and in which the short-circuiters are held in contact with the commutator on deceleration to a speed lower than the shorting speed on acceleration.

The above objects are attained in brief by providing a hollow commutator or rotor structure containing a series of short-circuiter elements mounted in such manner that they will move outwardly against the commutator bars to short-circuit the individual armature coils due to centrifugal effect and the rate of this outward movement of these short-circuiters is controlled by means of a cam. This cam can have any predetermined shape so as to give the desired rate of movement of the short-circuiter elements and thereby control the rate at which the wound rotor is transformed, in effect, into a squirrel cage or vice-versa.

The invention will be better understood when reference is made to the following description and the accompanying drawings in which:

Figure 1 is a section taken along line 1—1 in Figure 3 showing the position of the short-circuiter elements before they have moved outwardly to short-circuiting position.

Figure 2 is a fragmentary view similar to Figure 1 by showing the short-circuiters moved outwardly as result of centrifugal force and contacting the interior surface of the commutator bars to short-circuit the armature coils.

Figure 3 is a fragmentary longitudinal sectional view but with the shaft in elevation and showing the short-circuiting elements and a loading spring for urging these elements against a cam plate. In Figure 3 the short-circuiter elements are shown in a position, prior to the effect of

2 centrifugal force, out of contact with the commutator bars.

Figure 4 is a fragmentary view similar to Figure 3 but showing the short-circuiter elements moved outwardly, due to centrifugal force and against the commutator bars to short-circuit the individual armature coils.

The short circuiting device of this invention is especially designed for use with repulsion-induction motors. Such motors are well-known and, accordingly, no detailed disclosure of one is here given.

A motor of this type comprises a field, or stator, and a wound rotor, or armature. The armature has a commutator, and brushes bear on the commutator for defining flow paths for the current induced in the armature coils during the starting period of the motor, and at which time it runs as a repulsion motor. When the motor reaches a predetermined speed, the short circuiter throws in and interconnects all of the commutator bars, and thereafter, the motor runs as an induction motor.

It is desirable that the short circuiter throw in and out sharply and with a snap action to minimize sparking and to give the motor good operating characteristics and the short circuiter of this invention is particularly designed to give this type of operation.

Referring more particularly to the drawings the armature bars or segments 13 are insulatingly mounted, as indicated, on a drum 32. They are connected with armature coils, not shown, and in which current is induced by field coils, also not shown. Brushes 10 in pockets 11 are provided as shown in Figure 1. The latter is rigidly secured to the shaft 15. There is also a heavy circular plate 33 slidably mounted on the shaft, spaced from the drum 32 and provided with a lip portion 34. This lip is adapted to receive and to secure a plate element 35 which terminates at its periphery in a rectangularly formed portion 36 to leave an annular groove, 37. A conically shaped thrust spring 38 surrounds the shaft 15 and the large end portion bears against the plate 35 so as to urge this plate and also the plate 33 continuously to the right as seen in Figure 3. The smaller end of the spring 38 preferably fits the shaft rather snugly and bears against a plate 39 which is held in position by a snap ring 40.

There is arranged about the outer surface of the plate 33, a series of short-circuiting elements indicated generally by the reference character 41 and having a pair of legs 42, 43 spaced apart with rounded ends so as to leave a circular slot 44 between them. These legs are joined together at a neck portion 45 which terminates in a rounded portion 46. The latter is loosely received by the annular groove 37. A circular cam plate 47 is secured to the plate or drum 32, this cam plate being provided with an annular or circular bulge 48 which receives the leg 42 of each short-circuiting element 41. It has been pointed out that the coil spring 38 presses the plate 35 to the right (as shown in Figure 3) to maintain a sliding contact between the leg 42 of each element 41 with the curved cam portion 48.

As shown in Figure 1 the elements 41 are arranged side by side in a sliding fit. These elements are normally held against the peripheral surface of the plate 33 by means of a toroidal or garter spring 49 which is in a state of tension and presses against the inner surface of the groove 44, thus pressing against the outer surface of the leg 42 of the element 41. The members 41 may be made of any hard conducting metal such as steel, but are preferably copper.

In operation, as the armature rotates above a predetermined speed the elements 41 swivel at their curved ends within the groove 37 and tend to move outwardly against the restraining action of the spring 49. The rate at which they move is determined mainly by the centrifugal force exercised on the respective elements 41. At their farthest outward position the upper leg of each element will contact the inside surface of the rotating commutator and the armature coils connected to the commutator bars are spanned and short-circuited. Thus the motor is placed in condition for normal running squirrel cage operation as distinguished from the condition of repulsion starting where only a few of the windings are employed. If the speed of the rotor is reduced to somewhat under the predetermined speed, due to the load on the motor, the elements 41 will not immediately return to their inoperative position shown in Figure 3, but will be restrained by the cam 48. A substantial drop in speed is necessary to permit the elements 41 to move inwardly from their short circuiting position and at that time this movement takes place with a snap action.

The effect of the cam 48 is to hold the elements 41 in short-circuiting position for a longer time when the armature is being decelerated than during the accelerating movement. The cam contour can be so designed by calculation or by trial and error as to produce this result. This range in speed during which the short-circuiting elements 41 operate, depending on whether the rotor is in a decelerating or accelerating phase, is highly desirable in motor performance. The cam obviously permits a small longitudinal movement of element as well as the radial movement and thus controls the rate at which the elements, as a group, move outwardly in response to a steady increase in speed. These effects can be modified by regulating the thrust of the spring 38 as this thrust determines the pressure exerted between the leg 42 and the cam surface, thereby directly affecting the facility with which each element 41 moves outwardly in response to an increase in rotor speed. The spring 49, in addition to serving as a drag on the outward movements of the respective elements 41 also assists in retaining these elements in position against the outer surface of the plate 33. The effect of this spring in continuously forcing the elements 41 inwardly is to cause the elements to break their contact quickly with the commutator bars when the armature speed has been reduced to a predetermined value so that a positive snap action is obtained. This has the advantage of reducing arcing with resultant increase in commutator short-circuiter life.

Inasmuch as the outer surface of the upper leg 43 of the element 41 is horizontal when contact with the commutator bars is made the machining of the commutator interior becomes a simple matter and it is unnecessary to have a heavy undercut to accommodate this leg. Therefore, the machining of the commutator bars is reduced to the minimum and this in turn eliminates machining stresses on the commutator as a whole. Obviously, the undercut can be obtained by simple tools in a lathe. It will be noted that practically all of the parts of the segment short-circuiting apparatus are concealed within the commutator so that a considerable amount of protection is afforded these parts with consequent less opportunity for interference with their outward movement when occasion requires.

It will be understood that various modifications and arrangements in structure could be made without departing from the spirit of my invention and, accordingly, I desire to comprehend such modifications and substitutions of equivalents as may be considered to come within the scope of the appended claims.

Having thus fully described my invention, what I claim as new and desire to secure by Letters Patent is:

1. In combination; a rotatable segmented commutator and a short circuiting device therefor, said device comprising a plurality of short-circuiter elements at the end of said commutator and adapted to swing outwardly to short-circuit the segments thereof, each of said elements having a pair of spaced legs which terminate in a swivel portion, an annularly grooved plate for receiving the swivel portions of said elements, a cam associated with one of the legs of each element to control the outward movement of the elements toward said segments, a spring for urging said plate and the swivel portions of said elements toward said cam, the other of the legs of each element being adapted to make contact with the commutator segments when the elements have moved to their outermost position.

2. In combination; a rotatable segmented commutator and a short circuiting device therefor, said device comprising a plurality of short-circuiter elements at the end of said commutator and adapted to swing outwardly to short-circuit the segments thereof, each of said elements having a pair of spaced legs which terminate in a swivel portion, an annularly grooved plate for receiving the swivel portions of said elements, a continuous flexible member positioned within the annular space formed by said legs and serving resiliently to restrain the outward movement of the elements, a cam associated with one of the legs of each element to control the rate at which the elements move outwardly against the action of said flexible member, said plate being spring-urged toward said cam to constrain the associated leg of each element to follow the contour of the cam during its outward movement, the other of the legs of each element serving to make contact with the commutator segments when the elements have moved to their outermost position.

3. In combination; a rotatable segmented commutator and a short circuiting device therefor, said device comprising a plurality of swingable elements adapted to move outwardly in the radial direction when acted upon by centrifugal force and positioned to engage and short circuit the commutator segments when so moved, each of said elements being provided with a circular slot which form a groove when the elements are placed adjacent to one another, a continuous yieldable element contained within said groove and pressing against the inward surface of said slot in order to hold the elements at their innermost positions, a cam in contact with said elements, and means including a spring-urged plate for pressing said elements against said cam whereby when the centrifugal force is greater than a predetermined amount the elements will be caused to move outwardly against said yieldable member in a path determined by the shape of said cam and thereby control the facility with which the elements are caused to contact the commutator segments in response to changes in centrifugal force.

4. In a short circuiter for a commutator; a plurality of short-circuiter elements arranged side by side in an annular path adjacent the end of the commutator, said elements including pivot means at one end whereby they are adapted to swing outwardly and contact the segments of the commutator; and a member defining an annular groove receiving said pivot means, a cam bearing against said elements at their ends opposite said pivot means and including a high point over which said elements must ride in both directions of movement whereby the said elements have a snap action in both said directions of movement.

5. In a device of the character described, a rotatable armature having a shaft and a commutator, contact-making members rotatable with the shaft and normally out of contact-making position with the commutator but operable by centrifugal force to move toward contact-making position, means for constantly but yieldingly urging the members toward their non-contacting position, cam means engaging said members and including a high point over which the elements must ride in both directions of movement, and spring means resiliently urging said member and cam means together whereby said cam means is operable for restraining the contact members during the initial portion of their movement toward and away from their commutator contacting position.

6. A short circuiter for use with a rotatable segmented commutator and comprising; a plurality of short-circuiter elements arranged in an annular path at the end of and having pivot means at their outer ends, a member having a groove receiving said pivot means whereby said elements are inside said commutator and adapted to swing outwardly to short-circuit the segments, each of said elements having a pair of legs extending substantially horizontally from the pivot means of the element and spaced in a plane radial of said commutator, a cam in contact with the inner one of said legs to restrain the initial part of the movement of each element toward and away from said segments, the other of said legs serving as a contact-making surface with the segments when the elements have moved to their outermost position, and a resilient means extending around the annular space defined between the legs of said elements and continuously urging the said elements away from their short circuiting position.

7. In combination; a rotatable segmented commutator and a short circuiting device therefor, said device comprising a plurality of short-circuiter elements positioned in the end of said commutator to swing outwardly to short-circuit the segments, a cup flexibly holding said elements in position, each of said elements having a pair of spaced legs, an annular spring extending around said device in the space between said legs, a cam in contact with one of said legs operable to control the rate at which each element moves toward and away from said segments, means resiliently urging said elements toward said cam, the other of said legs serving as a contact-making surface with the segments when the elements have moved to their outermost position, said cam having a configuration such that said elements are maintained in their short-circuiting position to a speed during deceleration lower than the shorting speed on acceleration.

8. In combination; an armature and commutator mounted on a shaft, said commutator being hollow so as to leave an annular space between the commutator and shaft, a spring-urged collar surrounding the shaft and extending partially across said annular space, a plurality of elements swingably mounted and positioned in contact with the peripheral surface of said collar, said elements being held in position in the radial direction by a yieldable member, a cam contacting one end of the elements, a plate supported on said collar in engagement with the opposite ends of the elements, the pressure exerted by said yieldable member and the cam being overcome when centrifugal force greater than a predetermined amount is exerted on said elements to cause them to swing outwardly and contact the inner surfaces of the commutator segments, the rate of travel being determined by the shape of said cam whereby the elements will move away from the peripheral surface of said plate and will contact and short circuit the commutator segments.

9. In combination; an armature and a segmented commutator mounted on a shaft and said commutator being provided with an inner annular recess for receiving a short-circuiting device, said device comprising a plurality of elements positioned adjacent and slidably in contact with one another, a collar slidable on said shaft and against which the inner surfaces of said elements rest, a flexible member normally holding said elements in position against said collar, a conically shaped thrust-spring mounted on the shaft and bearing against said collar, said collar having a marginal flange contacting said slidable elements at one end, a cam contacting the opposite ends of said elements whereby when a centrifugal force greater than a predetermined amount is present, the elements will move outwardly along the cam surface against the action of said flexible member to contact the inner surfaces of the commutator segments, thereby short-circuiting the said segments, the rate of outward movement of the slidable elements being determined by the shape of said cam.

10. In combination; a segmented commutator and a segmented short-circuiter therefor mounted on a shaft, said commutator being provided with an inner annular recess for receiving short-circuiting elements, said elements being positioned adjacent and slidably in contact with one another, a collar slidable on said shaft, the inner surface of each of said elements resting against said collar, a garter spring normally holding said elements in position against said collar, a plate mounted on said collar, a thrust spring mounted on the shaft and bearing against said plate, said plate being adapted to contact the slidable elements at one end, a cam in engagement with the opposite ends of said elements, said elements being pressed toward the cam by said spring-urged plate to move the point of contact of each element with the cam beyond the high spot of the cam whereby the elements are caused to move outwardly with a snap action to contact said segments when the rotational speed of said short circuiter becomes greater than a predetermined speed.

11. In combination with an armature and a commutator mounted on a shaft, a short circuiting device for said commutator comprising elements for short-circuiting the commutator segments, said elements being positioned adjacent and slidably in contact with one another, a collar, the inner surface of said elements resting against said collar, a garter spring normally holding said elements in position against said collar, a plate on the end of the collar, a conically shaped thrust spring bearing against said plate, said plate being adapted to contact said slidable elements at one end, a cam contacting the opposite ends of said elements whereby when a centrifugal force greater than a predetermined amount is present, the elements will move outwardly along the cam surface against the action of said garter spring to contact the commutator segments thereby short circuiting the same, said cam being so shaped that the point of contact of each element therewith is on the outside of the high spot of the cam when the elements are out, and on the inside thereof when the elements are in.

12. In combination with a segmented commutator mounted on a shaft; a short-circuiting device comprising a flanged collar slidable on said shaft, a plurality of short-circuiting elements positioned adjacent one another, and a garter spring for yieldingly pressing the elements toward the peripheral surface of said collar, a cam, said elements being between said flange and cam, a thrust spring urging the collar in a direction to force the elements against the cam, said elements, when subjected to a centrifugal force greater than a predetermined amount, being adapted to slide along said cam past the high point thereof, causing a snap action outwardly toward the commutator segments.

13. In combination with a segmented commutator mounted on a shaft; a short-circuiting device comprising a flanged collar slidable on said shaft, a plurality of short-circuiting elements positioned adjacent one another, each element having a pair of spaced legs which form an annular groove when the elements are assembled, said legs terminating in a swivel portion held in fixed but rotatable position, a circular spring in said groove for yieldingly pressing the elements toward the peripheral surface of said collar, a cam, conical thrust spring engaging the swivel end portions of said elements and urging the elements against the cam, said elements, when subjected to centrifugal force greater than a predetermined amount, being adapted to pivot outwardly about their swivel portions, said cam presenting an incline to said elements during the first part of such outward movement and then a decline, whereby said elements move in both directions with a snap action and remain in engagement with the commutator under less force than required to cause them to snap out against said commutator.

14. A short circuiter for use with a rotatable segmented commutator and comprising; a plurality of short-circuiter elements at the end of and inside said commutator and having pivot means at one end whereby they are adapted to swing outwardly to short-circuit the segments, each of said elements having a pair of spaced legs, a cam in contact with one of said legs to restrain the initial part of the movement of each element toward and away from said segments, resilient means continuously urging said elements against said cam, the other of said legs serving as a contact-making surface with the segments when the elements have moved to their outermost position, and an annular spring member mounted in the space between said legs.

15. In combination; a rotatable segmented commutator and a short-circuiting device therefor mounted to rotate about a common axis, said device comprising a plurality of short-circuiter elements at the end of said commutator and adapted to swing outwardly to short-circuit the segments thereof, each of said elements having a pair of spaced legs which merge at one end in a swivel portion, an annularly groove plate for receiving the swivel portions of said elements, a cam associated with one of the legs of each element to control the outward movement of the elements toward said segments, a spring for urging said plate and said elements toward said cam, the other of the legs of each element being adapted to make contact with the commutator segments when the elements have moved to their outermost position, an annular spring extending around said device between said legs, and shaft means providing a common support for said commutator and said short circuiting device.

STEFFEN S. BROWN.

REFERENCES CITED

The following references are of record in the file of this patent:

UNITED STATES PATENTS

| Number | Name | Date |
|---|---|---|
| 1,394,535 | Bretch | Oct. 25, 1921 |
| 1,551,794 | Brockmeyer et al. | Sept. 1, 1925 |
| 1,673,518 | Leland | June 12, 1928 |
| 1,696,621 | Brump | Dec. 25, 1928 |
| 1,942,997 | Borchers | Jan. 9, 1934 |
| 2,292,537 | Morton | Aug. 11, 1942 |